United States Patent Office 3,553,282
Patented Jan. 5, 1971

3,553,282
SILOXANE CONTAINING POLYAMIDE
ACID BLENDS
Fred F. Holub, Schenectady, N.Y., assignor to General
Electric Company, a corporation of New York
No Drawing. Continuation-in-part of application Ser. No.
638,579, May 5, 1967. This application Sept. 8, 1969,
Ser. No. 856,144
Int. Cl. B44d 1/36; C08g 47/02
U.S. Cl. 260—824        20 Claims

ABSTRACT OF THE DISCLOSURE

This disclosure relates to siloxane containing polyamide acid blends convertible to corona resistant polymimide compositions. The siloxane containing polyamide acid blends comprise (A) a polyamide acid siloxane and (B) a silicon free polyamide acid, where (A) is utilized in the blend in an amount sufficient to provide at least one percent by weight of chemically combined silicon based on the weight of the blend. These blends provide wire insulating compositions which can be employed in applications where resistance to corona is highly desirable.

---

This application is a continuation-in-part of my co-pending application Ser. No. 638,579, filed May 15, 1967 now abandoned, and assigned to the same assignee as the present invention.

It is an object of this invention to provide polyimide compositions which are highly resistant to the effect of corona discharge in electrical applications. Other objects and advantages of this invention are detailed in or will be apparent from the disclosure and claims following.

There is provided by the present invention a blend comprising (A) from 5 to 95 parts by weight of a polyamide acid siloxane having the siloxane segment joined to the polyamide acid segment by a

linkage, and (B) from 5 to 95 parts by weight of a silicon free polyamide acid where (A) is utilized in the blend in an amount sufficient to provide at least one percent by weight of chemically combined silicon, Y is a divalent hydrocarbon radical, the unsatisfied valences of the silicon atom of the

linkage can be satisfied by a radical selected from —O—, monovalent organo radicals and mixtures thereof where the monovalent organo radicals are selected from monovalent hydrocarbon radicals, halogenated monovalent hydrocarbon radicals and cyanoalkyl radicals.

Radicals included by Y are, for example, alkylene, such as ethylene, propylene, butylene, dodecylene, etc.; arylene such as phenylene, tolylene, etc.; arylenealkylene such as phenylene ethylene,

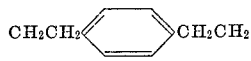

etc. The above monovalent organo radicals are, for example, aryl, such as phenyl, tolyl, xylyl, naphthyl; halogenated aryl such as chlorophenyl, chloroxylyl, etc., alkyl such as methyl, ethyl, propyl, butyl, phenyl, hexyl, heptyl, octyl, etc., alkenyl such as vinyl, allyl, etc., cyanoalkyl such as cyanoethyl, cyanobutyl, etc.

It has been found that the blends of the present invention provide polyimide films which have greatly improved corona resistance, as compared to films made from poly-amide acids free of chemically combined silicon. It has been further found that the blends of the present invention provide polyimide films having a toughness comparable or greater than the toughness of films made from the polyamide acid siloxane having approximately the same percent by weight of chemically combined silicon. Advantageously therefore, a wide variety of tough corona resistant polyimide films are provided by the present invention, which are based on a simple blending procedure. A source polyamide acid siloxane can be blended over a wide range by weight with one or more silicon free polyamide acids to provide valuable polyimide films having at least 1 percent by weight of chemically combined silicon.

Some of the polyamide acid compositions comprise, by weight, of (A) from 5 to 95 parts of a polyamide acid siloxane prepared by reacting an organic carboxylic acid dianhydride with an aminoorganosiloxane having at least two units selected from the group consisting of $R''_2SiO$, $R''SiO_{1.5}$ and $R''_3SiO_{0.5}$, where $R''$ includes monovalent organo radicals as previously defined, and amino hydrocarbon radicals of the formula —Y—$NH_2$, where Y is as previously defined, said aminoorganosiloxane having at least two of such —Y—$NH_2$ radicals per molecule, and (B) from 95 to 5 parts of a silicon free polyamide acid formed by reacting (1) an organic carboxylic acid dianhydride with (2) an organic primary diamine, the total mixture containing at least 1 percent, by weight, silicon.

Polyimide compositions included by the invention can be made by admixing (A) a polyamide acid siloxane and (B) a silicon free polyamide acid and curing said admixture to yield a polyimide. The simplest procedure is to mix solvent solutions of these polyamide acids and to thereafter remove the solvent and cure the admixture to yield the polyimide.

The curing of the polyamide acid admixture to a polyimide can be accomplished by heating the admixture to temperatures above 50° C. and advantageously from 150° to 500° C. for a few seconds to several hours, depending on the temperature, or by chemical treatment with an anhydride such as acetic anhydride and a tertiary amine, etc. As the curing is generally done by heat treatment of a solvent-deposited material, it may be necessary in some instances to adjust the rise in temperature so that the solvent is not evaporated too rapidly, thereby causing bubbles and/or voids in the cured polyimide films. This is particularly true when thick films are desired. If desirable, however, a foam may be produced by rapid evaporation of the solvent during curing.

Polyimide compositions included by the invention can more readily be depicted as comprising, by weight, (A) from 5 to 95 parts of an organosiloxane-containing polyimide having recurring units of the formula,

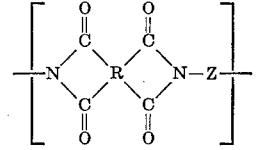

wherein R is a tetravalent radical containing at least six carbon atoms in a ring, said ring characterized by benzenoid unsaturation, the four carbonyl groups being attached to separate carbon atoms and each pair of carbonyl groups being attached to adjacent carbon atoms in a 6-membered benzenoid ring of the R radical and wherein Z is a member of the class consisting of R' radicals and divalent organic radicals containing at least two silicon atoms, joined to each other through at least one silicon-to-oxygen-to-silicon bond, the nitrogen being bonded to a carbon atom which is bonded to said silicon through a divalent organic radical by a carbon-to-silicon bond at least one Z being an organosiloxane containing unit and (B) from 95 to 5 parts of a polyimide having recurring units of the formula,

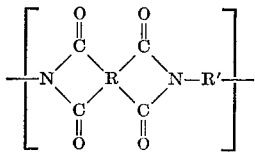

wherein R is as above defined and R' is a divalent organic radical free of silicon containing at least two carbon atoms, the total mixture containing at least 1 percent, by weight, silicon.

Polyamide acid siloxane employed in this invention can be produced by reacting a tetracarboxylic dianhydride of the formula, (1)

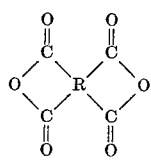

wherein R is a tetravalent radical containing at least one ring of six carbon atoms, said ring characterized by benzenoid unsaturation, the four carbonyl groups being attached directly to separate carbon atoms, each pair of carbonyl groups being attached to adjacent carbon atoms in a six-member benzenoid ring of the R radical, with an aminoorganosiloxane. The term "aminoorganosiloxane" as used hereinafter will signify aminosiloxane having

radicals, where the unsatisfied valences of the silicon atom are satisfied by a radical selected from —O—, R", and mixtures thereof, and chemically combined siloxy units included by $$(R'')_a SiO_{\left(\frac{4-a}{2}\right)}$$

where R" is as previously defined, and "a" is an integer having a value of from 1 to 3 inclusive. Aminoorganosiloxane also will include a mixture of such aminosiloxane having such

radicals, and organic diamines of the formula, (2)  $Q(NH_2)_2$ where Q is a divalent organic radical selected from heterocyclic radicals, —Y—, and —YGY—, where Y is as previously defined, and G is a divalent radical selected from —O—,

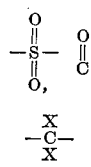

where X is selected from hydrogen, methyl, and trihalomethyl radicals, such as trifluoromethyl, trichloromethyl, etc. The polyamide acid siloxane of the present invention can be made with aminoorganosiloxane having from 0 to 75 mole percent of organic diamine based on the total moles of aminosiloxane and organic diamine in the aminoorganosiloxane. This reaction is conducted by merely mixing the dianhydride with the aminoorganosiloxane with or without a solvent, but preferably in the presence of an inert mutual organic solvent in accordance with the procedure and conditions set forth in my copending application Ser. No. 455,311, filed May 12, 1965 (now Pat. 3,325,450), and in my applications Ser. No. 638,636 now Pat. 3,435,002, and Ser. No. 638,634 now Pat. 3,392,144, filed May 15, 1967, which applications are made a part hereof by reference thereto.

Solvents which can be employed are, for example, N,N-dimethylformamide, N,N-dimethylacetamide, N,N-diethylformamide, N,N-diethylacetamide, N,N-dimethylmethoxyacetamide, dimethylsulfoxide, N-methyl-2-pyrrolidone, pyridine, dimethylsulfone, hexamethylphosphoramide, tetramethylenesulfone, phenol, phenol-water mixtures, and dimethyltetramethylenesulfone. Mixtures of these solvents with other inert organic solvents such as benzene, benzonitrile, dioxane, beta-ethoxyethylacetate, butyrolactone, xylene, toluene and cyclohexane, can also be employed.

The silicon free polyamide acid is produced by employing organic diamine defined above and employing the procedures given in U.S. Pats. 3,179,630, 3,179,631, and 3,179,634.

Illustrative of the tetravalent organic radicals that R represents are, for example,

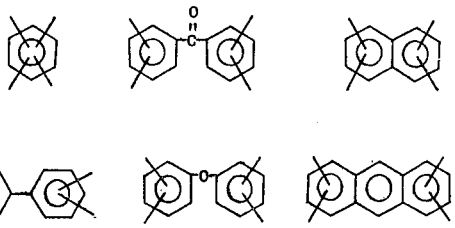

etc.

Illustrative of the dianhydrides suitable for use preparing compositions of the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4-dicarboxyphenyl)sulfone dianhydride; 3,4,3,10 - perylene tetracarboxylic dianhydride; bis(3,4 - dicarboxyphenyl) ether dianhydride; 2,2-bis(2,3-dicarboxyphenyl) propane dianhydride; 1,1-bis(2,3-dicarboxyphenyl) ethane dianhydride; 1,1-bis(3,4-dicarboxyphenyl) ethane dianhydride; bis(3,4-dicarboxyphenyl) methane dianhydride; bis(2,3-dicarboxyphenyl) sulfone dianhydride; benzophenone tetracarboxylic dianhydride, etc., and mixtures thereof. Further examples of these dianhydrides can be found in the applications and U.S. patents hereinabove set forth and included herein by reference.

Included among the organic diamines of Formula 2 which can be employed in the practice of the invention are, more particularly, the organic diamines characterized by the formula $H_2N—R'—NH_2$, wherein R' is a divalent organic radical and can be aliphatic or aromatic. For example, R' can be ethylene, propylene, hexylene, ethyleneoxyethylene, ethyleneoxypropylene, propyleneoxypropylene, phenylene, naphthylene, biphenylene, anthrylene,

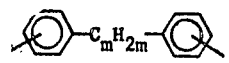

where $m$ is 1 to 10, etc.

Some of the organic diamines which are suitable for use in the present invention are, for example, meta-phenylene diamine; paraphenylene diamine; 4,4'-diamino-diphenyl propane; 4,4'-diamino-diphenyl methane; benzidine; 4,4'-diamino-diphenyl sulfide; 4,4'-diamino-diphenyl sulfone; 3,3'-diaminodiphenyl sulfone; 4,4'-diamino-diphenyl ether; 2,6-diamino-pyridine; bis(4-amino-phenyl) phosphine oxide; bis(4-amino-phenyl)-N-methylamine; 1,5-diamino-naphthalene; 3,3'-dimethyl - 4,4' - diamino-biphenyl; 3,3'-dimethoxy benzidine; 2,4-bis(beta-amino-t-butyl)toluene; bis - (para - beta-amino-t-butyl-phenyl) ether; para-bis(2-methyl-4-amino-pentyl)benzene; para-bis-(1,1-dimethyl - 5 - amino-pentyl)benzene; m-xylylene diamine; p-xylylene diamine; bis(para-amino-cyclohexyl) methane; ethylene diamine; propylene diamine; hexamethylene diamine; heptamethylene diamine; octamethylene diamine; nonamethylene diamine; decamethylene diamine; 3-methylheptamethylene diamine; 4,4-dimethylheptamethylene diamine; 2,11-diamino-dodecane; 1,2-bis-(3-amino-propoxy)ethane; 2,2 - dimethylpropylene diamine; 3-methoxy-hexamethylene diamine; 2,5-dimethylhexamethylene diamine; 2,5-dimethylheptamethylene diamine; 5-methylnonamethylene diamine; 1,4-diaminocyclohexane; 1,12-diamino-octadecane; 2,5-diamino-1,3,4-oxadiazole; $H_2N(CH_2)_3O(CH_2)_2O(CH_2)_3NH_2$;

$$H_2N(CH_2)_3S(CH_2)_3NH_2$$

$H_2N(CH_2)_3N(CH_3)(CH_2)_3NH_2$; and mixtures thereof.

The aminosiloxanes employed in producing the siloxane containing polyamide acid and polyimides employed in this invention can be any organosiloxane which contains an average of at least two —$YNH_2$ radicals per molecule where Y is as above defined and is attached to silicon through a silicon-carbon bond. The animosiloxanes contain at least two siloxane units which can be $R''_3SiO_{0.5}$, $R''_2SiO$ or $R''SiO_{1.5}$, where R'' is as above defined.

Illustrative of the —Y—$NH_2$ group which R'' can represent and which is attached to silicon by C-Si linkages, are aminoalkyls such as aminopropyl, aminobutyl, aminododecyl, aminomethyl, etc.; aminoaryl groups such as aminophenyl, aminotolyl, aminoxylyl, aminonaphthyl. etc.; aminoalkylaryl groups such as aminomethylphenyl, aminomethyltolyl, aminoethylphenyl, aminopropylphenyl, etc., and aminoarylalkyl groups such as aminobenzyl, aminophenylethyl, aminophenylpropyl, etc.

Illustrative of monovalent organic radicals which R'' represents, in addition to the —Y—$NH_2$ group above, are monovalent hydrocarbon groups, halogenated monovalent hydrocarbon groups and cyanoalkyl groups. For example, such halogenated monovalent radicals represented by R'' are, alkyl radicals, for example, methyl, ethyl, propyl, butyl, octyl, octadecyl, etc.; aryl radicals, for example, phenyl, naphthyl, tolyl, xylyl, etc.; aralkyl radicals, for example, benzyl, phenylethyl, phenylpropyl, etc.; alkenyl ardicals, for example, vinyl, allyl, cyclohexenyl, cycloheptenyl, etc.; cycloaliphatic radicals, for example, cyclohexyl, cyclopentyl, cycloheptyl, etc.; halogenated monovalent hydrocarbon radicals, for example, chloromethyl, dibromophenyl, trifluoromethylpropyl, trifluoromethylphenyl, chloropropyl, etc. and cyanoalkyl radicals, for example, cyanomethyl, alpha-cyanopropyl, delta-dyanobutyl, etc.

The aminosiloxanes employed to produce the polyamide acid siloxanes and polyimides of this invention contain at least two amino-hydrocarbon radicals which can be located at any position in the siloxane chain. It is preferred to employ linear siloxane polymers having the general structure $R''_3SiO(R''_3SiO)_nSiR''_3$, where R'' is as above defined and at least two of the R'' groups are aminohydrocarbon groups and n has a value of from 0 to 200 and preferably from 0 to 100. Illustrative of these preferred aminosiloxanes are, for example,

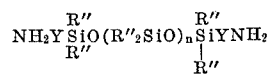

such as,

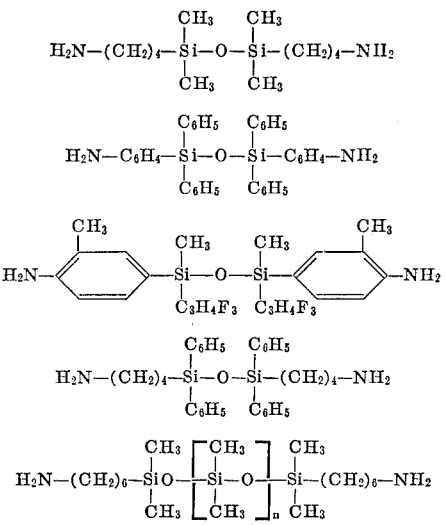

etc., where n is 0 to 100 or more,

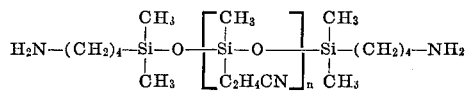

where n is 0 to 100 or more.

Illustrative of the polyamide acid siloxanes employed in the compositions of this invention are, for example, polyamide acid siloxanes of the formula,

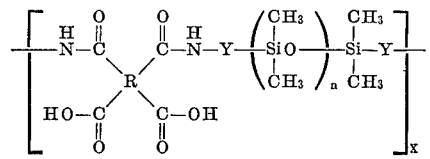

where n is as defined above, and x is an integer greater than 1, for example, from 5 to 10,000 or more, R can be

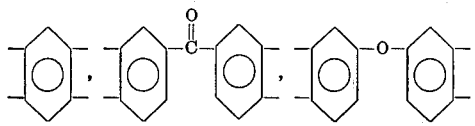

etc., and Y is —$(CH_2)_3$—, —$(CH_2)_4$,

etc. Other examples of these organosiloxane polyamide acids can be found in my copending applications hereinabove set forth.

The compositions of the present invention have many uses. Because of their high temperature resistance, and corona resistance, they are exceptionally suitable as insulation for electrical conductors. Solutions of the initial mixture composed of the polyamide acid siloxane and silicon free polyamide acid can be applied as coatings to electrical conductors such as copper, aluminum, alloys of copper, etc., and thereafter the coated conductors heated at the elevated temperatures required to effect removal of the solvent and to cause imidization of the polymer. Films and fibers can be extruded or can be cast from solutions of the initial mixture and the solvent then can be evaporated and cyclization to form the polyimides attained by heating the film or fiber at the elevated temperatures required for the purpose.

The following examples serve to further illustrate the invention. All parts are by weight unless otherwise expressly stated. The corona tests (calculated on an equivalent thickness basis) were made according to ASTM D–2275–64T which specifies the electrodes. The test chamber used was at 25° C. and contained $CaCl_2·2H_2O$ to maintain the relative humidity between 17–20 percent.

A voltage of 1200 volts was applied at 3160 Hertz (cycles/second).

EXAMPLE 1

To a reaction vessel flushed with nitrogen was charged (A) 10 grams of a solution of a polyamide acid prepared by reacting p,p'-methylene dianiline (21.78 grams, 0.11 M) with benzophenone tetracarboxylic dianhydride (32.2 grams, 0.1 M) in N-methylpyrrolidone (216.92 grams) and (B) 10 grams of a solution of a siloxane polyamide acid polymer prepared by reacting 1,3-bis-delta-aminobutyltetramethyl disiloxane (2.76 grams, 0.01 M) with benzophenonetetracarboxylic dianhydride (3.22 grams, 0.01 M) in N-methyl pyrrolidone (13.96 grams). The mixture was stirred at room temperature for twelve hours and then filtered to give a blend of polysiloxane amide acid and a polyamide acid free of silicon in (25 percent solids) N-methyl pyrrolidone solvent. Thin films of the mixture were coated on an aluminum surface and were cured by heating at 100° C. for one hour, at 150° C. for one hour, at 200° C. for one hour, and at 250° C. for 15–20 minutes. The imide films thus obtained were self-supporting and exhibited a glass transition temperature ($T_g$) of 121° C., and a crystalline melting point ($T_m$) of 302° C.

The corona resistance of this film was found to be 52 times greater than the corona resistance of a polymer film prepared without addition of the siloxane polymer of (B) above.

EXAMPLE 2

To a reaction vessel flushed with nitrogen was charged 10 grams of a solution of a polyamide acid prepared by reacting meta-phenylene diamine (3.24 grams, 0.03 M) with benzophenone tetracarboxylic dianhydride (9.66 grams, 0.03 M) in N-methyl pyrrolidone (51.6 grams) and 10 grams of a solution of a siloxane polyamide acid prepared by reacting meta-phenylene diamine (1.94 grams, 0.018 M),

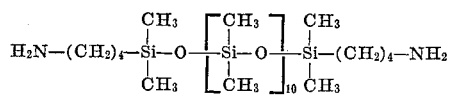

(2.03 grams, 0.002 M), with benzophenone tetracarboxylic dianhydride (6.44 grams, 0.02 M) in N-methyl pyrrolidone (41.8 grams). The mixture was stirred at room temperature for 15 minutes and then filtered to give a blend of polysiloxane amide acid and a polyamide acid free of silicon (20 percent solids) in N-methyl pyrrolidone solvent.

Films were coated on an aluminum surface and were cured by heating at 100° C. for one hour, at 150° C. for one hour, at 200° C. for one hour, and at 250° C. for 15–20 minutes. These siloxane-containing polyimide films thus obtained were flexible, and had a cut-through temperature of 400° C. and have an improved corona resistance over a polyimide film free of siloxane groups.

EXAMPLE 3

To a reaction vessel flushed with nitrogen was charged 10 grams of a solution of a polyamide acid prepared by reacting meta-phenylene diamine (3.24 grams, 0.03 M) with benzophenone tetracarboxylic dianhydride (9.66 grams, 0.03 M) in N-methyl pyrrolidone (51.6 grams) and 10 grams of a solution of polysiloxane amide acid prepared by reacting p,p'-methylene dianiline (1.98 grams, 0.01 M), 1,3-bis-delta-aminobutyltetramethyldisiloxane (2.76 grams, 0.01 M) with benzophenone tetracarboxylic dianhydride (6.44 grams, 0.02 M) in N-methyl pyrrolidone (44.6 grams). The mixture was stirred at room temperature for 15 minutes and then filtered to give a blend of polysiloxane amide acid and a polyamide acid free of silicon (20 percent solids) in N-methyl pyrrolidone solvent. Films were coated on an aluminum surface and were cured by heating at 100° C. for one hour, at 150° C. for one hour, at 200° C. for one hour, and at 250° C. for 15–20 minutes. These polysiloxaneimide films thus obtained were flexible and had a cut-through temperature of 310° C., and have improved corona resistance over a polyimide film free of siloxane units.

EXAMPLE 4

To a reaction vessel flushed with nitrogen was charged 10 grams of a solution of polyamide acid prepared by reacting p,p'-methylene dianiline (5.94 grams, 0.03 M) with pyromellitic dianhydride (6.54 grams, 0.03 M) in N-methyl pyrrolidone (49.9 grams), and 10 grams of polysiloxane amide acids prepared by reacting 1,2-bis-delta-aminobutyltetramethyl disiloxane (13.8 grams, 0.05 M) with pyromellitic dianhydride (10.9 grams, 0.05 M) in N-methyl pyrrolidone (98.8 grams). The mixture was stirred at room temperature for 15 minutes and then filtered to give a blend of polysiloxane amide acid and a polyamide acid free of silicon (20 percent solids) in N-methyl pyrrolidone. Films were cast on an aluminum surface and were cured by heating at 100° C. to 250° C. The polysiloxaneimide films thus obtained were adherent and have improved corona resistance over a polyimide film free of siloxane units.

EXAMPLE 5

To a reaction vessel flushed with nitrogen was charged 10 grams of a solution of polyamide acid prepared by reacting p,p'-methylene dianiline (20.0 grams, 0.101 M) with benzophenone tetracarboxylic dianhydride (32.2 grams, 0.1 M) in 88 percent phenol-12 percent water solvent (208.8 grams), and 10 grams of a solution of polyamide siloxane acid prepared by reacting p,p'-methylene dianiline (1.98 grams, 0.01 M), 1,3-bis-delta-aminobutyltetramethyl disiloxane (2.76 grams, 0.01 M) with benzophenone tetracarboxylic dianhydride (6.44 grams, 0.02 M) in 88 percent phenol-12 percent water solvent (44.6 grams). The mixture was stirred at room temperature for 15 minutes and then filtered to give a blend of polyamide acid free of silicon and a polyamide siloxane acid (20 percent solids) in 88 percent phenol-12 percent water solvent. Films were coated on an aluminum surface and were cured by heating at 100° C. to 250° C. The polysiloxane imide films thus obtained were flexible and have improved corona resistance over a polyimide film free of siloxane units.

EXAMPLE 6

A variety of N-methylpyrrolidone polyamide acid blends of various polyamide acid siloxanes and silicon free polyamide acids were prepared in N-methylpyrrolidone in accordance with the practice of the invention having from 1.94 percent to 5.7 percent by weight of chemically combined silicon. The following shows the materials employed in making the respective polyamide acids:

BPDA=3,3',4,4'-benzophenonetetracarboxylic dianhydride
MM=bis(delta-aminobutyl) tetramethyldisiloxane
MDA=p,p'-methylenedianiline
HMDA=hexamethylene diamine
SDA=sulfonyldianiline
PMDA=pyromellitic dianhydride
ODA=oxydianiline
EDA=ethylene-bis(trimellitate) dianhydride
TMAC=4-chloroformylphthalic anhydride The polyamide acid siloxanes employed in the blends were made in accordance with the procedure of Example 1. Amide acid siloxane A was made by effecting reaction between equal molar amounts of BPDA and MM. The BPDA was added to a solution of the MM in N-methylpyrrolidone. The resulting mixture was placed on a roll mill for two hours until a desirable viscosity build-up was achieved. Amide acid siloxane B was made by the same procedure, except that EDA was substituted for the BPDA.

The silicon-free polyamide acids also were made by the procedure of Example 1 employing substantially equal molar amounts of organic diamine and organiccarboxylic acid dianhydride. Polyamide acid (I) was made from equal molar amounts of BPDA and HMDA. The dianhydride was added to a solution of the organic diamine in N-methylpyrrolidone. The resulting mixture was placed on a roll mill for two hours to provide for a satisfactory viscosity build-up. Polyamide acid (II) was made from BPDA and SDA. Additional silicon free polyamide acids were made by the same procedure including an equal molar amount of an appropriate organic carboxylic acid dianhydride and organic diamine. Composition V was made by reacting TMAC with MDA precipitating the polymer with water and redissolving the polymer in N-methylpyrrolidone.

Blends of the above-described polyamide acid siloxanes and silicon free polyamide acids were made in accordance with the method of Example 1. The following shows the compositions of the blends where "Siloxane" indicates the polyamide acid siloxane, "Organic" indicates the silicon free polyamide acid and " Wt. Percent Si" is based on the total weight of the blend. The compositions of the polyamide acid siloxane and silicon free polyamide acid used in making the blends, and the compositions of the resulting blends also are shown below in molar ratios:

POLYAMIDE ACID

| Siloxane | Organic |
|---|---|
| A=(BPDA-MM) | I=(BPDA-HMDA) |
| B=(EDA-MM) | II=(BPDA-SDA) |
|  | III=(PMDA-ODA) |
|  | IV=(EDA-MDA) |
|  | V=(TMAC-MDA) |
|  | VI=(BPDA-MDA) |

| Blend | Siloxane | Organic | Weight percent Si |
|---|---|---|---|
| 1 | A | I | 5.4 |
| 2 | A | 4II | 1.94 |
| 3 | A | III | 4.5 |
| 4 | B | IV | 4.1 |
| 5 | A | IV | 4.25 |
| 6 | A | V | 5.7 |
| 7 | A | 4VI | 2.1 |
| 8 | A | VI | 5 |

Thin films of the blends were cast respectively on glass plates coated with trichlorodiphenyl. The films were then cured at 150° C. for one hour and 200° C. for one hour. Films also are made by the same procedure from the silicon free polyamide acid used in the respective blends. The corona resistance of the films made from the blends are found to be superior to the films made from the silicon free polyamide acids.

In order to further demonstrate the unexpected features of the present invention, polyamide acid siloxanes C and D were made having the same weight percent silicon as Blends 7 and 8 shown above. Polyamide acid siloxane C was made by effecting reaction between BPDA and a mixture of MM and MDA in accordance with the procedure of Example 2 showing the preparation of a polyamide acid siloxane utilizing an aminoorganosiloxane consisting of a mixture of aminosiloxane and an organic diamine. There was utilized an equal molar amount of the BPDA and the aminoorganosiloxane which consisted of 80 mole percent of MDA and 20 mole percent of MM based on the total moles of diamine. Polyamide acid siloxane D was prepared containing 5 percent by weight of silicon by effecting reaction between an equal molar amount of BPDA and aminoorganosiloxane consisting of equal molar amounts of MM and MDA.

In preparing the aforementioned polyamide siloxanes, a mixture of the aminosiloxane and organic diamine was stirred with N-methylpyrrolidone until a solution was obtained. The BPDA was then added to the resulting solution of the aminoorganosiloxane and the resulting mixture was placed on a roll mill for two hours to provide for a satisfactory viscosity build-up. Films of Blends 7 and 8 above and polyamide acid siloxanes C and D were then evaluated for cut-through resistance comparing the respective films at the same total weight percent silicon. Cut-through was measured in accordance with the procedure of Precopio et al. Pat. 2,936,296, assigned to the same assignee as the present invention. The films were cast from N-methylpyrrolidone on a treated glass plate and cured at 150° C. for one hour and 200° C. for one hour. It was found that the films made from the blends had cut-throughs equal to or greater than the cut-throughs of the films made from the polyamide acid siloxanes.

Based on the above results, those skilled in the art would know that the polyamide films having a wide range of corona and superior cut-through resistance can be made from the blends of the present invention by simply varying the proportions of the polyamide acid siloxanes with the silicon free polyamide acid. This procedure provides for a significant advantage over the method of making polyamide film from a polyamide acid siloxane of a particular weight percent silicon which must be made individually from the original starting reactants.

It will, of course, be apparent to those skilled in the art that organic carboxylic acid dianhydrides and organic diamines and organoaminosiloxanes other than those set forth in the above examples can be employed to produce a wide variety of polyamide acid polymers both silicon free and those containing silicon, which can be employed in producing the compositions of this invention without departing from the scope thereof.

I claim:

1. A polyamide acid composition comprising a blend of
   (A) from 5 to 95 parts by weight of a polyamide acid siloxane having the siloxane segment joined to the polyamide acid segment by a

linkage, and
   (B) from 95 to 5 parts by weight of a silicon-free polyamide acid,
   where (A) is utilized in the blend in an amount sufficient to provide for at least one percent by weight of chemically combined silicon, Y is a divalent hydrocarbon radical, the unsatisfied valences of the silicon atom of the

linkage can be satisfied by a radical selected from —O—, monovalent hydrocarbon radicals, halogenated monovalent hydrocarbon radicals and cyanolkyl radicals,
   and the polyamide acid of (A) is the product of reaction of (i) an organic carboxylic acid dianhydride, and (ii) a diamine selected from the class consist of aminoorganosiloxane and a mixture of such aminoorganosiloxane and primary organic diamine,
   and the polyamide acid of (B) is the product of reaction of (i) and primary organic diamine.

2. A polyamide acid composition in accordance with claim 1, where (B) is a reaction product of 4-chloroformylphthalic anhydride and p,p'-methylenedianiline.

3. A polyamide acid composition in accordance with claim 1, where (A) is a reaction product of ethylene-bis(trimellitate) dianhydride and bis(deltaaminobutyl)tetramethyldisiloxane.

4. A polyamide acid composition in accordance with claim 1, where (B) is a reaction product of ethylene-bis(trimellitate) dianhydride and p,p,'-methylenedianiline.

5. A polyimide film formed by curing the composition of claim 1.

6. A polyamide acid composition containing at least one percent by weight of chemically combined silicon and comprising a blend of (A) from 5 to 95 parts by weight of the reaction product of an organic carboxylic acid dianhydride and an aminoorganosiloxane having

radicals, and chemically combined siloxy units included by the formula,

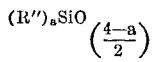

where R″ is a member selected from monovalent hydrocarbon radicals, halogenated monovalent hydrocarbon radicals, cyanoalkyl radicals and —YNH$_2$ radicals, $a$ is an integer equal to 1 to 3 inclusive and —Y— is a divalent hydrocarbon radical, and the unsatisfied valences of the silicon atom of the

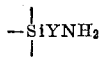

radicals can be satisfied by a radical selected from —O—, R″, and mixtures thereof, and (B) from 95 parts to 5 parts by weight of the reaction product of the organic carboxylic acid dianhydride of (A) and a primary organic diamine.

7. A polyamide acid composition in accordance with claim 6, where the organic carboxylic acid dianhydride is a tetracarboxylic dianhydride of the formula,

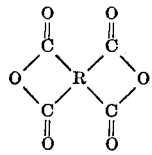

where R is a tetravalent radical containing at least one ring of six carbon atoms, said ring characterized by benzenoid unsaturation, the four carbonyl groups being attached directly to separate carbon atoms, each pair of carbonyl groups being attached to adjacent carbon atoms in a six-member benzenoid ring of the R radical.

8. A polyamide acid composition in accordance with claim 6, where the primary organic diamine is an organic diamine of the formula,

Q(NH$_2$)$_2$ where Q is a divalent organic radical selected from heterocyclic radicals, Y, and YGY, where Y is a divalent hydrocarbon radical, and G is a divalent radical selected from —O—,

and

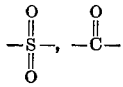

where X is selected from hydrogen, methyl and trihalomethyl.

9. A polyamide acid composition in accordance with claim 6, where the aminoorganosiloxane is a mixture of an aminosiloxane having chemically combined

radicals and consisting essentially of chemically combined siloxy units included by the formula,

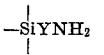

and an organic amine of the formula,

Q(NH$_2$)$_2$ where the various terms are as previously defined.

10. A polyamide acid composition in accordance with claim 6, where the aminoorganosiloxane has the formula,

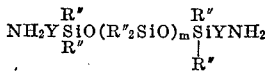

where $m$ has a value of 0 to 200 and R″ and Y as a divalent hydrocarbon radical defined.

11. A polyamide acid composition in accordance with claim 6, where (A) is a reaction product of benzophenone tetracarboxylic acid dianhydride and 1,3-bis-delta-aminobutyl tetramethyldisiloxane.

12. A polyamide acid composition in accordance with claim 6, where (B) is a reaction product of benzophenone tetracarboxylic acid dianhydride and p,p′-methylene dianiline.

13. A polyamide acid composition in accordance with claim 6 where (B) is a reaction product of pyromellitic dianhydride and oxydianiline.

14. A polyamide acid composition in accordance with claim 6 where (B) is a reaction product of benzophenone tetracarboxylic acid dianhydride and sulfonyldianiline.

15. A polyamide acid composition containing at least one percent by weight of chemically combined silicon and comprising a blend of (A) from 5 to 95 parts by weight of the reaction product of:
  (i) a tetracarboxylic acid dianhydride of the formula:

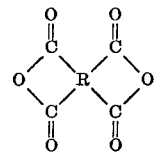

(ii) a polyamino organosiloxane selected from the class consisting of
    (a) an aminoorganosiloxane having at least two units selected from the group consisting of R″$_2$SiO, R″SiO$_{1.5}$, and R″$_3$SiO$_{0.5}$, and
    (b) a mixture of said aminoorganosiloxane and an organic diamine of the formula,

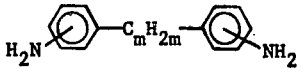

or meta phenylene diamine, (B) from 95 to 5 parts by weight of the reaction product of (i) and the organic diamine of (ii(b)), where R is a tetravalent radical containing at least six carbon atoms in a ring, said ring being characterized by benzenoid unsaturation, the four carbonyl groups being attached to separate carbon atoms and each pair of carbonyl groups being attached to adjacent carbon atoms in a 6-membered benzenoid ring of the R radical, R″ is a monovalent organic radical selected from the group consisting of hydrocarbon radicals, halogenated hydrocarbon radicals, cyanoalkyl radicals, and amino hydrocarbon radicals of the formula —Y—NH$_2$, wherein Y is a divalent hydrocarbon radical, said siloxane having at least two —Y—NH$_2$ radicals per molecule, and $m$ is an integer equal to 1 to 10, inclusive.

16. A composition of matter as claimed in claim 15 wherein (A) is the reaction product of (1) benzophenone tetracarboxylic acid dianhydride and (2) an aminosiloxane of the formula,

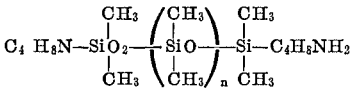

where $n$ is an integer of from 0 to 100.

17. A composition of matter as claimed in claim 15 wherein (A) is the reaction product of (1) benzophenone tetracarboxylic acid dianhydride and (2) 1,3-bis-delta-aminobutyl tetramethyldisiloxane.

18. A composition as claimed in claim 15 wherein (B) is the reaction product of (1) benzophenone tetracarboxylic acid dianhydride and (2) p,p'-methylene dianiline.

19. A composition as claimed in claim 15 wherein (B) is the reaction product of meta-phenylene diamine and benzophenone tetracarboxylic acid dianhydride.

20. An organosiloxane-containing polyimide, which is made by heating the polyamide acid composition of claim 15.

References Cited

UNITED STATES PATENTS 3,342,897  9/1967  Abramo _____ 260—857

SAMUEL H. BLECH, Primary Examiner

U.S. Cl. X.R.

117—132, 232; 260—2.5, 30.2, 30.4, 30.6, 30.8, 31.4, 32.4, 32.6, 33.4, 33.6, 46.5, 47, 65, 78, 448.2

UNITED STATES PATENT OFFICE
CERTIFICATE OF CORRECTION

Patent No. 3,553,282  Dated January 5, 1971

Inventor(s) Fred F. Holub

It is certified that error appears in the above-identified patent and that said Letters Patent are hereby corrected as shown below:

Column 12, line 70, cancel

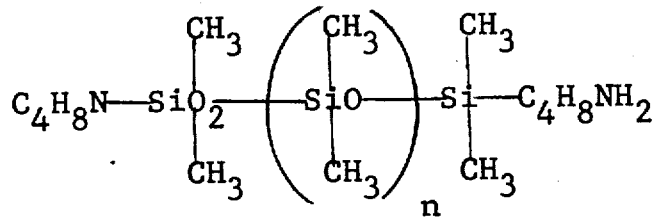

and substitute -

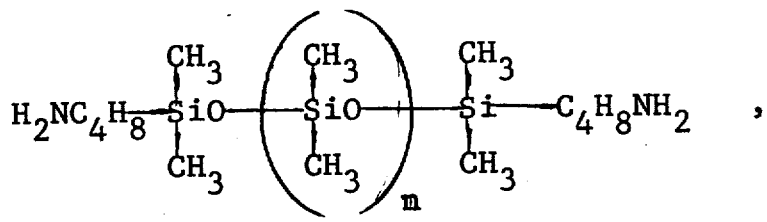

Signed and sealed this 25th day of May 1971.

(SEAL)
Attest:

EDWARD M. FLETCHER, JR.
Attesting Officer

WILLIAM E. SCHUYLER, JR
Commissioner of Patents